US012300928B2

(12) United States Patent
Imaizumi et al.

(10) Patent No.: US 12,300,928 B2
(45) Date of Patent: May 13, 2025

(54) CONNECTOR RETAINER

(71) Applicant: SUBARU CORPORATION, Tokyo (JP)

(72) Inventors: Tomonori Imaizumi, Tokyo (JP); Yujiro Kondo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 394 days.

(21) Appl. No.: 18/055,638

(22) Filed: Nov. 15, 2022

(65) Prior Publication Data

US 2023/0163523 A1 May 25, 2023

(30) Foreign Application Priority Data

Nov. 24, 2021 (JP) ................................ 2021-190404

(51) Int. Cl.
*H01R 13/627* (2006.01)
*H01R 13/426* (2006.01)

(52) U.S. Cl.
CPC ....... *H01R 13/6275* (2013.01); *H01R 13/426* (2013.01); *H01R 2201/26* (2013.01)

(58) Field of Classification Search
CPC .............. H01R 13/6275; H01R 13/426; H01R 2201/26; H01R 13/639; H01R 13/6272
See application file for complete search history.

(56) References Cited

U.S. PATENT DOCUMENTS

| | | | | |
|---|---|---|---|---|
| 10,290,973 B1 * | 5/2019 | Gisoldi | H01R 13/62955 | |
| 11,764,511 B2 * | 9/2023 | Fischer | H01R 13/5812 | 439/476.1 |
| 2010/0221939 A1 * | 9/2010 | Fakhri | H01R 9/05 | 439/153 |
| 2016/0104968 A1 * | 4/2016 | Bartholomew | H01R 13/447 | 439/142 |
| 2020/0350719 A1 * | 11/2020 | Lehmann | H01R 13/405 | |
| 2023/0163523 A1 * | 5/2023 | Imaizumi | H01R 13/426 | 439/352 |

FOREIGN PATENT DOCUMENTS

| | | |
|---|---|---|
| EP | 1 684 389 A1 | 7/2006 |
| JP | 2006-202557 A | 8/2006 |
| JP | 2010-541188 A | 12/2010 |

* cited by examiner

*Primary Examiner* — Abdullah A Riyami
*Assistant Examiner* — Nader J Alhawamdeh
(74) *Attorney, Agent, or Firm* — Smith, Gambrell & Russell, LLP

(57) ABSTRACT

A connector retainer attached to a connector device includes a cover, a locking arm, an engagement arm, and an engagement claw. The cover has a surface being flat and extending in a direction parallel to an engagement direction in which a first and second connectors of the connector device are engaged. The cover is configured to cover an outer surface of an engagement maintaining mechanism for maintaining the engagement state of the connectors. The locking arm projects from the surface of the cover in a direction crossing the engagement direction. The engagement arm projects from the surface of the cover in the direction crossing the engagement direction. The engagement claw is disposed at a tip end of the engagement arm, and is configured to engaged with a projection of the second connector.

2 Claims, 8 Drawing Sheets

CONNECTOR RETAINER

CROSS-REFERENCE TO RELATED APPLICATIONS

The present application claims priority from Japanese Patent Application No. 2021-190404 filed on Nov. 24, 2021, the entire contents of which are hereby incorporated by reference.

BACKGROUND

The disclosure relates to a connector retainer to be attached to a connector device including an engagement maintaining mechanism.

Hitherto, a large number of electrical accessories have been used in vehicles such as automobiles. Such accessories generally include an electrical coupling cable (hereinafter referred to as "harness") for maintaining electrical coupling between devices. Such a harness generally has a configuration including an electrical wire bundle formed by bundling electrical wires for supplying electricity from a power source or for performing, for example, signal communication between devices, and a multi-conductor connector attachable to an end portion of the electrical wire bundle.

For example, a connector (hereinafter referred to as "harness connector") provided to an end portion of such a harness has a configuration for engaging with a connector (hereinafter referred to as "device-side connector") provided to a device and maintaining a coupling state of the harness.

In such a case, for example, a harness connector having a projecting shape or a recessed shape and a device-side connector having a recessed shape or a projecting shape, the harness connector and the device-side connector thus being configured to be engaged with each other, are widely and generally put to practical use. A connector device is formed by a pair of connectors that are a harness connector and a device-side connector configured in this manner.

In addition, an example of such existing connector devices is generally put to practical use. This connector device includes an engagement maintaining mechanism (so-called engagement locking mechanism). In a state in which a harness connector and a device-side connector are engaged with each other, this engagement maintaining mechanism is used for maintaining the state in which the connectors are engaged with each other by, for example, locking, to a projecting member provided to one of the connectors, a claw member provided to the other of the connectors.

In an engagement maintaining mechanism of such an existing connector device, a projecting member, a claw member, or the like may be damaged due to, for example, deterioration of those members caused by repeatedly performing engagement and disengagement thereof or time-dependent deterioration of the material thereof. In addition, for example, in a vehicle such as an automobile, a connector device may be disposed on the outside of the vehicle such as a part under the floor of the vehicle. When a connector device is disposed in such a harsh environment, for example, an engagement maintaining mechanism may suffer damage, such as being hit by stones on a road or the like.

Thus, when a connector device is damaged, for example, it is difficult to maintain a state in which connectors are engaged with each other. This may cause electrical malfunction. In addition, when each connector is damaged, the connector or a harness may be replaced. However, it is clear that the workload for such a replacement operation is huge.

Thus, for example, a connector device usable in a vehicle such as an automobile is intended to adopt measures for increasing the redundancy of an engagement maintaining mechanism of the connector device to inhibit electrical malfunction of notable components, thus improving safety, and to reduce, as much as possible, replacement operations or the like whose workloads are huge.

Accordingly, for example, measures have hitherto been devised in which the dispositions of accessories and a harness connector in a vehicle are improved to locate a connector device at a position that is less likely to be affected by hitting stones and the like and in which a protective cover or the like for protecting a connector is attached thereto.

However, in consideration of restrictions in improving component dispositions, ease of maintenance, or the like, these measures have limitations in increasing the redundancy of an engagement maintaining mechanism of a connector device and achieving a configuration in which the engagement maintaining mechanism is protected.

For example, hitherto, Japanese Unexamined Patent Application Publication (Translation of PCT Application) (JP-T) No. 2010-541188 and Japanese Unexamined Patent Application Publication (JP-A) No. 2006-202557 disclose various configurations in which simple components are added to easily improve an engagement state of a connector device.

For example, JP-T No. 2010-541188 discloses a configuration in which, in a state in which a harness connector is coupled to a device-side connector, another component configured to cover the parts of the connectors engaged with each other and to support the engagement of the connectors is additionally attached to improve the reliability of the state in which the connectors are engaged with each other.

In addition, for example, JP-A No. 2006-202557 discloses a configuration in which, when connectors are coupled by engaging a female housing and a male housing with each other and a hook fitting is held in a guide groove of the female housing, a hook member of the hook fitting is engaged in a fixing groove of the male housing, thus maintaining a state in which the connectors are engaged with each other.

SUMMARY

An aspect of the disclosure provides a connector retainer configured to be attached to a connector device. The connector device is provided with a first connector, a second connector, and an engagement maintaining mechanism. The second connector is configured to be engaged with the first connector, and includes an exposed member and a projection projecting outward from the exposed member. The exposed member is a part of an outer surface of the second connector exposed to an outside in an engagement state in which the first connector and the second connector are engaged with each other. The engagement maintaining mechanism is configured to maintain the engagement state in which the first connector and the second connector are engaged with each other. The connector retainer includes a cover, a locking arm, an engagement arm, and an engagement claw. The cover has a surface that is flat and extends in a direction parallel to an engagement direction in which the first connector is engaged with the second connector. The cover is configured to cover an outer surface of the engagement maintaining mechanism. The locking arm projects from the surface of the cover in a direction crossing the engagement direction. The locking arm is configured to lock a lockable plate of the first connector. The engagement arm projects from the surface of the cover in a direction crossing the engagement direction. The engagement arm is configured to be disposed so as to surround a part of the exposed member of the second connector. The engagement claw is disposed at a tip end of the engagement arm. The engagement claw is configured to be engaged with the projection.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

DETAILED DESCRIPTION

Existing configurations disclosed in, for example, JP-T No. 2010-541188 and JP-A No. 2006-202557 each ensure redundancy of an engagement maintaining mechanism of a connector device but have a problem that a configuration in which the engagement maintaining mechanism is protected is not sufficiently achieved.

It is desirable to provide a connector retainer serving to ensure redundancy of an engagement maintaining mechanism included in a connector device and to protect the engagement maintaining mechanism of the connector device.

a. In the following, an embodiment of the disclosure is described in detail with reference to the accompanying drawings. Figures used in the following description are schematic figures and may illustrate components whose size relationships, scales, and the like differ from each other to illustrate each component with a size in which the component can be recognized on a figure. Thus, the disclosure is not limited to the illustrated embodiment in terms of, for example, the numbers, shapes, size proportions, and relative positional relationships of the components illustrated in the figures.

Figure 1:
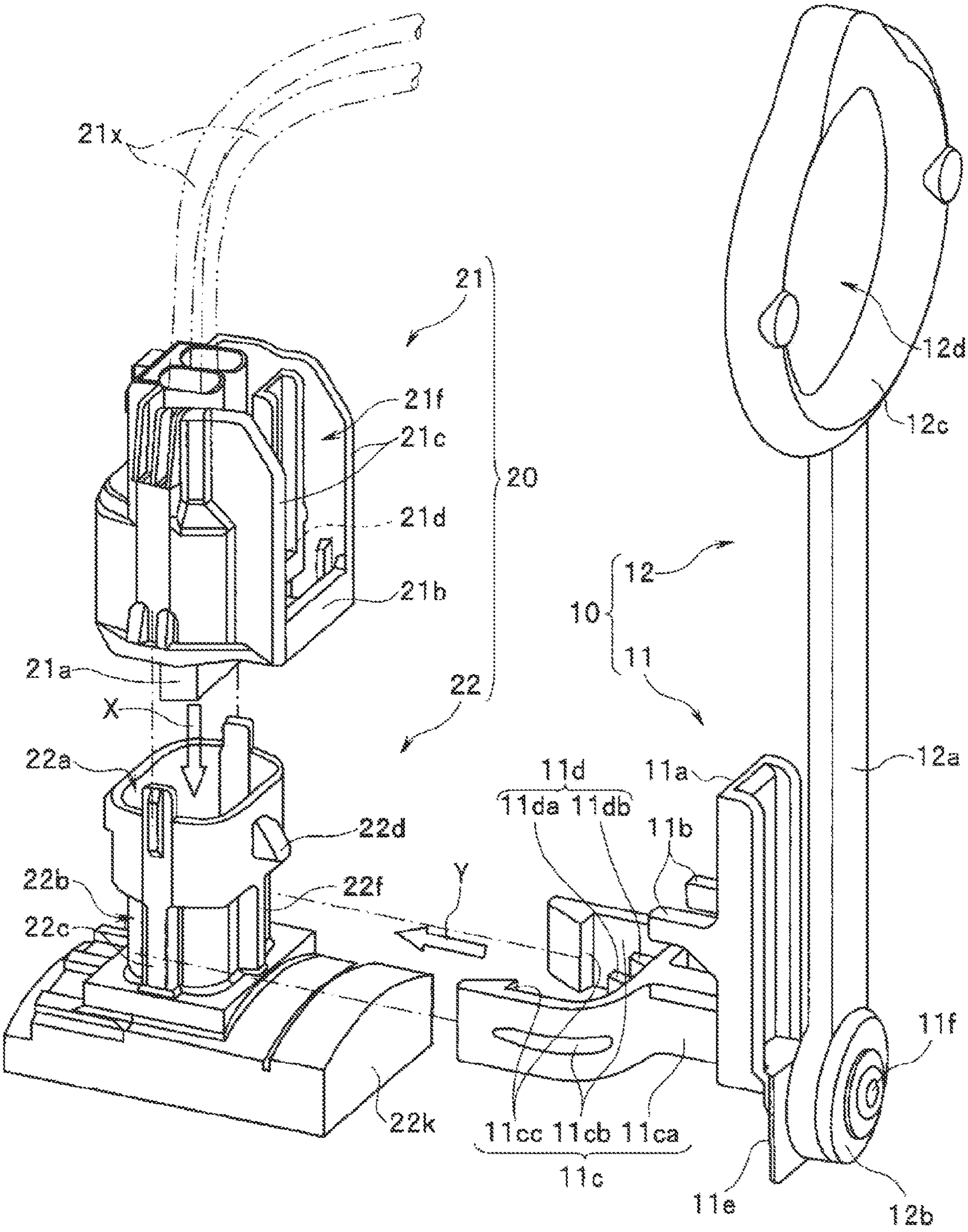
FIG. 1 is a schematic perspective view illustrating a connector retainer of an embodiment of the disclosure and an example of a connector device to which the connector retainer is attached.

FIG. 1 is a schematic perspective view illustrating a connector retainer of an embodiment of the disclosure and an example of a connector device to which the connector retainer is attached. FIG. 1 illustrates the connector retainer of the embodiment that is yet to be assembled to the corresponding connector device. In addition, this case illustrates a state in which a pair of connectors forming the connector device are also yet to be engaged with each other (disengagement state).

Figure 2:
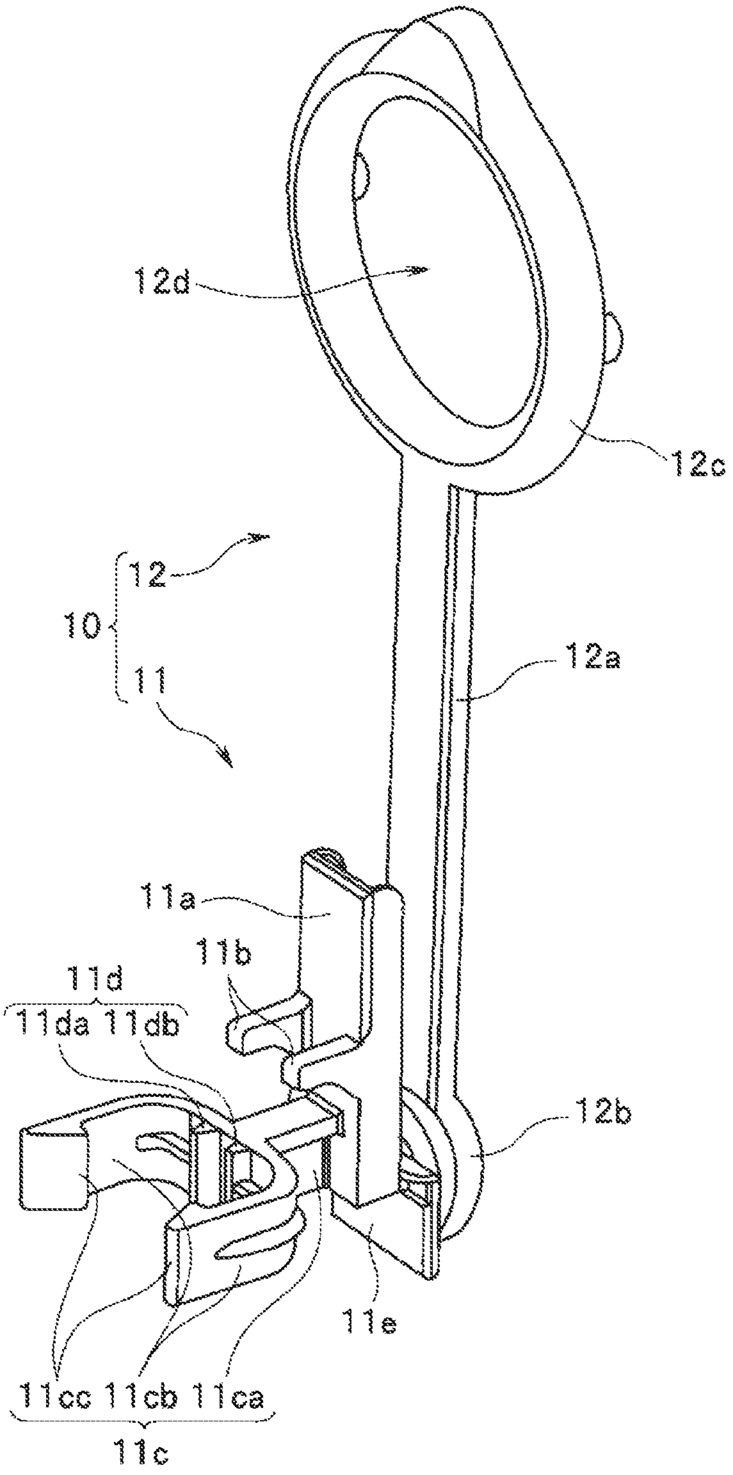
FIG. 2 is a schematic perspective view of the connector retainer of the embodiment of the disclosure when viewed from an angle different from that in FIG. 1.
Figure 3:
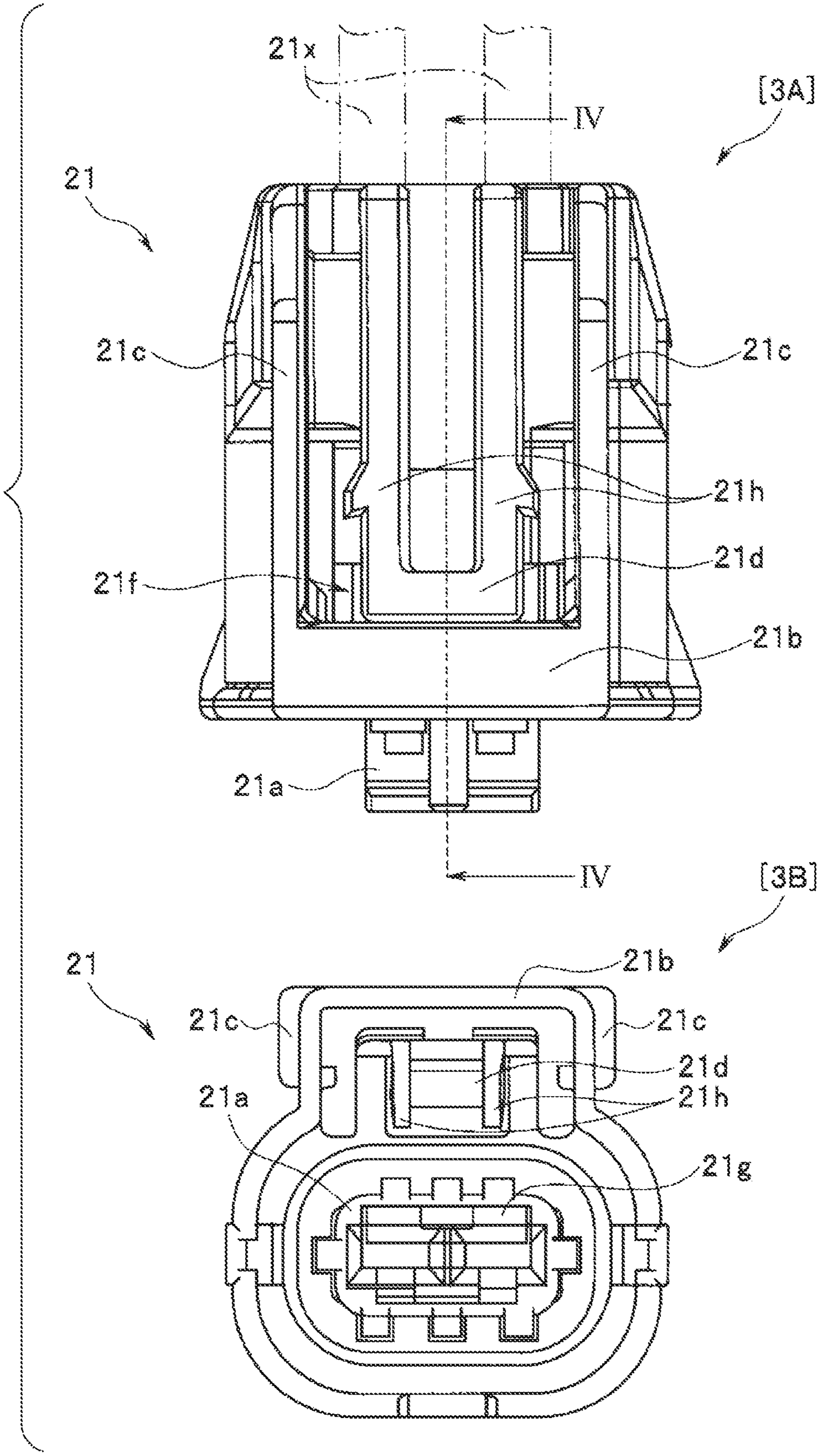
FIG. 3 is a diagram illustrating a schematic configuration of a first connector (harness connector) of the connector device to which the connector retainer of the embodiment of the disclosure is attached.
Figure 4:
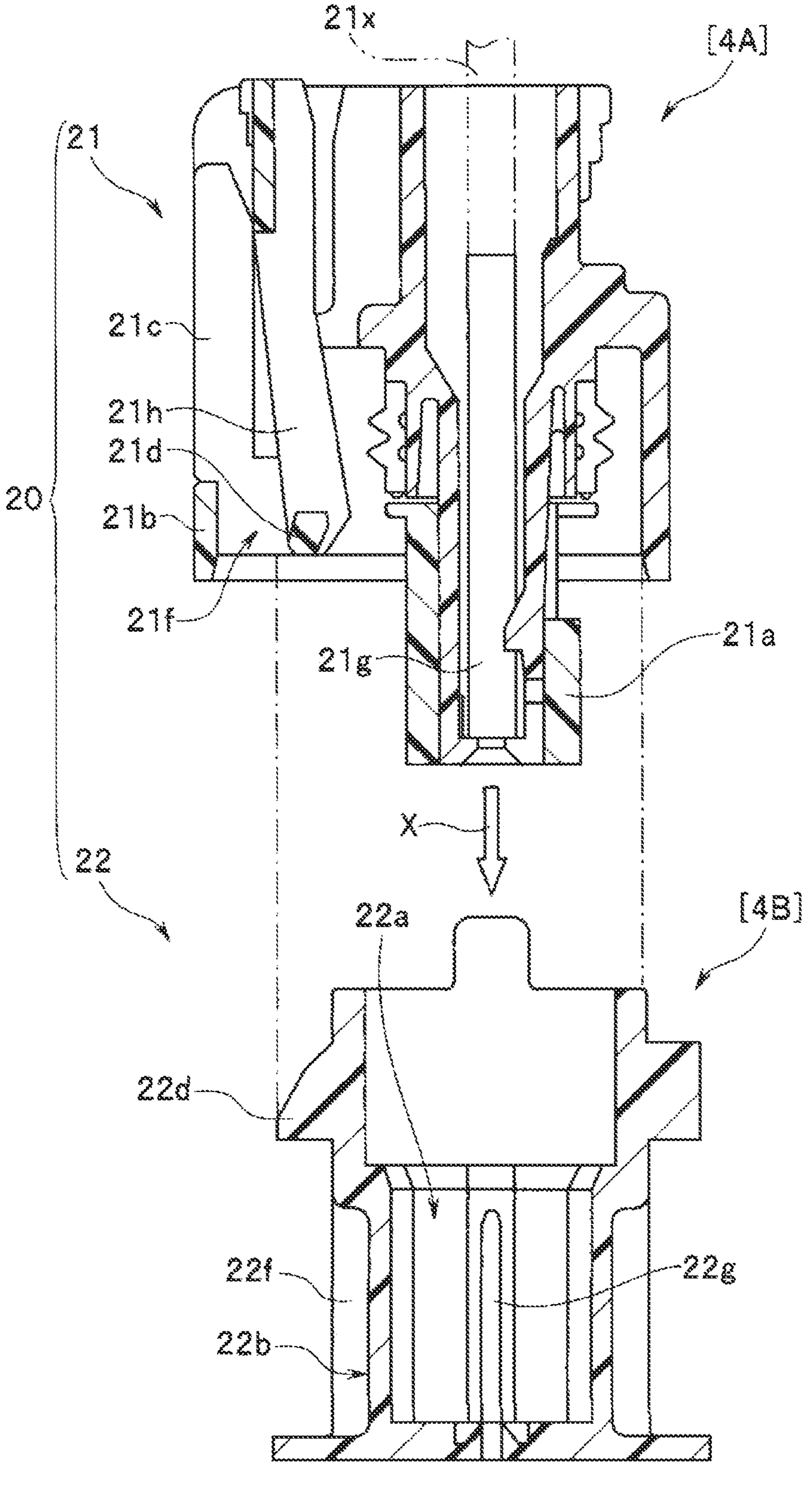
FIG. 4 is a sectional view illustrating the part where the first connector (harness connector) and a second connector (device-side connector) are engaged with each other of the connector device to which the connector retainer of the embodiment of the disclosure is attached.

FIG. 2 is a schematic perspective view of the connector retainer of the embodiment of the disclosure when viewed from an angle different from that in FIG. 1. FIG. 3 is a diagram illustrating a schematic configuration of a first connector (harness connector) of the connector device to which the connector retainer of the embodiment of the disclosure is attached. In this case, a reference sign 3A in FIG. 3 represents a front view. In addition, a reference sign 3B in FIG. 3 represents a plan view illustrating the internal configuration. FIG. 4 is a sectional view illustrating the part where the first connector (harness connector) and a second connector (device-side connector) are engaged with each other of the connector device to which the connector retainer of the embodiment of the disclosure is attached. In this case, a reference sign 4A in FIG. 4 represents a section (section along line IV-IV in FIG. 3) of the first connector (harness connector). A reference sign 4B in FIG. 4 represents a section (corresponding to the section along line IV-IV in FIG. 3) of the device-side connector.

First, a schematic configuration of the connector device to which the connector retainer of the embodiment is attached will be described below with reference to FIG. 1, FIG. 3, and FIG. 4.

As illustrated in FIG. 1, a connector device 20, to which a connector retainer 10 of the embodiment is attached, is mainly formed by a pair of connectors. The pair of connectors are a harness connector 21, which is a first connector, and a device-side connector 22, which is a second connector.

The harness connector 21 is a connector provided to an end portion of a harness extending from an electrical accessory (electrical component unit). The harness is an electrical coupling cable for maintaining electrical coupling between devices and for supplying electricity from a power source or for performing, for example, signal communication between devices. For example, the harness has a configuration including electrical wire bundles 21*x*, which are formed by bundling electrical wires, and a multi-conductor connector attached to an end portion of each of the electrical wire bundles 21*x*. The harness connector 21 corresponds to the multi-conductor connector attachable to the end portion of the harness. The harness connector 21 includes a projecting engagement member 21*a*.

On the other hand, the device-side connector 22 is a connector provided to a predetermined device (not illustrated). The device-side connector 22 is a multi-conductor connector compatible with the harness connector 21. The device-side connector 22 includes a recessed engagement member 22*a*.

Coupling between the harness and the device is configured to be maintained by engaging the projecting engagement member 21*a* of the harness connector 21 and the recessed engagement member 22*a* of the device-side connector 22 with each other. The direction in which the harness connector 21 is engaged with the device-side connector 22 is represented by arrow X in FIG. 1 and FIG. 4.

A hollow region is formed in the projecting engagement member 21*a* of the harness connector 21. Coupling terminals 21*g* (not illustrated in FIG. 1 and see FIG. 3 and FIG. 4), to which the end portion of each of the electrical wire bundles 21*x* is coupled, are provided in this hollow region. These coupling terminals 21*g* are disposed such that each axial direction thereof is parallel to the engagement direction X.

In response to this, a hollow region is formed in the recessed engagement member 22*a* of the device-side connector 22. Coupling terminals 22*g* (not illustrated in FIG. 1 and see FIG. 4) are provided in this hollow region. These coupling terminals 22*g* are disposed such that each axial direction thereof is parallel to the engagement direction X.

In a state in which the projecting engagement member 21*a* of the harness connector 21 and the recessed engagement member 22*a* of the device-side connector 22 are engaged with each other, the coupling terminals 21*g* and the coupling terminals 22*g* are in contact with each other, thus maintaining coupling between the harness and the device.

The harness connector 21 includes a locking claw 21*d* (not illustrated in FIG. 1 and see FIG. 3 and FIG. 4), which forms a part of the engagement maintaining mechanism of the connector device 20. The locking claw 21*d* is formed on one of the side outer surfaces of the harness connector 21, the one of the side outer surfaces being configured to face the connector retainer 10 of the embodiment when the connector retainer 10 is attached to the connector device 20. The locking claw 21*d* is formed at tip ends of arms 21*h*, which have a cantilever shape and which extend from a fixing part of the harness connector 21. The arms 21*h* are formed so as to have elasticity.

The locking claw 21*d* is formed in an internal region of a space 21*f*, which is surrounded by a pair of walls 21*c* provided upright toward the outside from a side outer surface of the harness connector 21 and a plate-like locking member 21*b*, the plate-like locking member 21*b* being a lockable plate that couples end portions of the pair of walls 21*c* and that covers a part of the side outer surface of the harness connector 21. The space 21*f* has an opening that is open to the outside other than the pair of walls 21*c* and the plate-like locking member 21*b*.

Although described later in detail, the plate-like locking member 21*b* serves as a lockable member configured to, when the connector retainer 10 of the embodiment is attached to the connector device 20 in an engagement state, be disposed close to locking arms 11*b* (described later in detail) of the connector retainer 10 to inhibit the harness connector 21 from moving in the direction in which the harness connector 21 is removed.

In response to this, the device-side connector 22 includes a lockable projection 22*d* (see FIG. 1 and FIG. 4), which forms a part of the engagement maintaining mechanism of the connector device 20. The lockable projection 22*d* is formed on one of the side outer surfaces of the device-side connector 22, the one of the side outer surfaces being configured to face the connector retainer 10 of the embodiment when the connector retainer 10 is attached to the connector device 20. When the harness connector 21 moves toward the device-side connector 22 in the direction of arrow X to form the engagement state of the connector device 20, the lockable projection 22*d* is disposed on the movement path of the locking claw 21*d*. That is, when the harness connector 21 moves toward the device-side connector 22 in the direction of arrow X, the lockable projection 22*d* is disposed at the position where the lockable projection 22*d* comes into contact with the locking claw 21*d* during the movement.

Then, in the state in which the projecting engagement member 21*a* of the harness connector 21 and the recessed engagement member 22*a* of the device-side connector 22 are engaged with each other, the locking claw 21*d* is locked to the lockable projection 22*d*. Thus, in a state in which the locking claw 21*d* and the lockable projection 22*d* are locked to each other, the state in which the connectors 21 and 22 are engaged with each other is maintained. In addition, in this state, the pair of walls 21*c* and the plate-like locking member 21*b* forming the space 21*f* protect peripheries of the engagement maintaining mechanism (21*d* and 22*d*).

The device-side connector 22 includes an exposed member 22*b* (see FIG. 1 and FIG. 4), which is a part of a side outer surface of the device-side connector 22 exposed in the state in which the projecting engagement member 21*a* of the harness connector 21 and the recessed engagement member 22*a* of the device-side connector 22 are engaged with each other, and lockable projections 22*c* and 22*f* (see FIG. 1), which project outward from the exposed member 22*b*. The lockable projections 22*c* are formed on the part of the exposed member 22*b* corresponding to the part on which an attachment arm unit 11*c* (described later in detail) of the connector retainer 10 is disposed when the connector retainer 10 of the embodiment is attached to the connector device 20 in the engagement state. The lockable projection 22*f* is provided on the same surface on which the lockable projection 22*d* is formed.

The lockable projections 22*c* and 22*f* are each formed so as to extend in the direction parallel to the direction along the engagement direction X. The exposed member 22*b* and the lockable projections 22*c* and 22*f* serve as engagement parts configured to maintain the state in which the connector retainer 10 of the embodiment is attached to the connector device 20 (described later in detail). The schematic configuration of the connector device 20 has been described so far.

Next, the configuration of the connector retainer 10 of the embodiment will be described below with reference to FIG. 1 and FIG. 2.

The connector retainer 10 of the embodiment is a component configured to be provided and attached to the connector device 20 in the state in which the harness connector 21 (first connector) and the device-side connector 22 (second connector) are engaged with each other to ensure redundancy of the engagement maintaining mechanism (21*d* and 22*d*) of the connector device 20.

As illustrated in FIG. 1 and FIG. 2, the connector retainer 10 of the embodiment is formed by a retainer body 11 and a tether 12.

The retainer body 11 is a body component at which the connector retainer 10 is attached to the corresponding connector device 20. The retainer body 11 is formed so as to include a cover 11*a*, the locking arms 11*b*, the attachment arm unit 11*c*, whose tip ends have respective engagement claws 11*cc*, a rotation inhibiting member 11*d*, an improper attachment inhibiting member 11*e*, and a support shaft 11*f*.

The cover 11*a* has a flat surface having a predetermined area. The flat surface of the cover 11*a* is disposed at a position where the flat surface covers the opening of the space 21*f* of the harness connector 21 when the connector retainer 10 is attached to the connector device 20 in the engagement state. In this case, the flat surface of the cover 11*a* is formed so as to extend parallel to the engagement direction X of the connector device 20. Thus, the cover 11*a* serves to cover and protect outer surfaces of the engagement maintaining mechanism (21*d* and 22*d*) of the connector device 20 in the engagement state.

The locking arm 11*b* has a predetermined length and has a rod shape. The locking arms 11*b* are formed so as to project parallel to each other, in a direction substantially orthogonal to the flat surface of the cover 11*a*, from the vicinities of the respective side edges in a lateral direction of the flat surface of the cover 11*a*. That is, for example, two locking arms 11*b* are formed. When the connector retainer 10 is attached to the connector device 20 in the engagement state, a part of the tip end of each of the pair of locking arms 11*b* is disposed in the internal region of the space 21*f* of the harness connector 21. In this case, the pair of locking arms 11*b* are disposed at positions overlapping the plate-like locking member 21*b* of the harness connector 21 in the direction along the engagement direction X of the connector device 20.

That is, even when an external force is applied to the harness connector 21 in the direction in which the harness connector 21 is removed from the device-side connector 22 (direction opposite to the engagement direction X) in the state in which the connector retainer 10 is attached to the connector device 20 in the engagement state, the pair of locking arms 11*b* lock the plate-like locking member 21*b* of the harness connector 21. Thus, the pair of locking arms 11*b* inhibit the harness connector 21 from being removed from the device-side connector 22. In other words, the pair of locking arms 11*b* lock the plate-like locking member 21*b* to inhibit the engagement of the connector device 20 from being released. Thus, the locking arm 11*b* serves as a member configured to retain the connector device 20.

The attachment arm unit 11*c* is an arm part that projects, in the direction substantially orthogonal to the flat surface of the cover 11*a*, from a part of the flat surface of the cover 11*a* located closer to the lower end thereof in a longitudinal direction and that has a substantially Y shape as a whole. The attachment arm unit 11*c* is formed so as to include a base end shaft 11*ca*, a pair of tip end arms 11*cb*, and the pair of engagement claws 11*cc*.

The base end shaft 11*ca* is a shaft part formed so as to project from the flat surface of the cover 11*a* in a direction (forward direction) orthogonal to the flat surface of the cover 11*a*. The pair of tip end arms 11*cb* are arm parts formed so as to diverge in the lateral direction from the tip end of the base end shaft 11*ca* and thereafter project in the same direction (forward direction) as the direction in which the base end shaft 11*ca* projects. The pair of tip end arms 11*cb* extend parallel to each other so as to face each other. The engagement claws 11*cc* are a pair of claw parts formed at the respective tip ends of the pair of tip end arms 11*cb*. The engagement claws 11*cc* have claw members formed on the surfaces (inner side surfaces) facing each other. The claw members of the engagement claws 11*cc* each have an inclined surface having a predetermined shape. For example, the inclined surface of the engagement claw 11*cc* is formed so as to form a predetermined angle (angle widened from the tip end toward the base end of the tip end arm 11*cb*) with the direction in which the connector retainer 10 is attached (direction of arrow Y in FIG. 1).

The attachment arm unit 11*c* is attached so as to surround a part of the exposed member 22*b* when the connector retainer 10 is attached to the connector device 20 in the engagement state. For example, when the connector retainer 10 is attached to the connector device 20 in the engagement state, the pair of tip end arms 11*cb* of the connector retainer 10 are first disposed so as to surround a part of the exposed member 22*b* of the device-side connector 22, and the engagement claws 11*cc* of the connector retainer 10 are subsequently engaged with the respective lockable projections 22*c*.

Thus, the width between the pair of tip end arms 11*cb* in the lateral direction is set to be substantially equal to or slightly narrower than the width of the part of the exposed member 22*b* of the connector device 20 to which the pair of tip end arms 11*cb* are attached. In this case, the pair of tip end arms 11*cb* are formed so as to have elasticity in the direction in which the pair of tip end arms 11*cb* face each other. With this configuration, the pair of tip end arms 11*cb* serve to maintain the state in which the connector retainer 10 is attached to the exposed member 22*b* of the connector device 20.

The rotation inhibiting member 11*d* includes a pair of projections 11*da* and 11*db*, which project, in the same direction (forward direction) as the direction in which the base end shaft 11*ca* projects, from the tip end (part from which the pair of tip end arms 11*cb* diverge to form a Y shape) of the base end shaft 11*ca* of the attachment arm unit 11*c*. The pair of projections 11*da* and 11*db* are formed at a predetermined interval in the lateral direction. The interval in the lateral direction is set to be slightly wider than the width of the lockable projection 22*f* of the device-side connector 22 in the lateral direction.

The pair of projections 11*da* and 11*db* of the rotation inhibiting member 11*d* are disposed so as to hold the lockable projection 22*f* of the device-side connector 22 therebetween in the lateral direction when the connector retainer 10 is attached to the connector device 20 in the engagement state. Thus, the rotation inhibiting member 11*d* serves to inhibit the connector retainer 10 from rotating around the exposed member 22*b* of the device-side connector 22 when the attachment arm unit 11*c* of the connector retainer 10 is attached to the exposed member 22*b*.

The improper attachment inhibiting member 11*e* is formed substantially parallel to the flat surface of the cover 11*a* and has a flat surface having a predetermined area. The flat surface of the improper attachment inhibiting member 11*e* is formed so as to extend in the direction opposite to the direction in which the cover 11*a* extends.

When the connector retainer 10 is attached to the connector device 20 in the engagement state, the improper attachment inhibiting member 11*e* is disposed at a position that is parallel to and faces a base surface 22*k* of the device-side connector 22. Thus, the improper attachment inhibiting member 11*e* serves to stop, at a predetermined position, movement of the connector retainer 10 in the direction in which the connector retainer 10 is attached (direction of arrow Y in FIG. 1). In addition, the improper attachment inhibiting member 11*e* serves to stably hold the position of the connector retainer 10 at which the connector retainer 10 is attached. Thus, for example, when the connector retainer 10 is attached upside down to the connector device 20 in the engagement state, the connector retainer 10 may not be attached in a stable state. Thus, the improper attachment inhibiting member 11*e* also serves to inhibit improper attachment of the connector retainer 10.

The support shaft 11*f* is a shaft part for attaching and fixing the tether 12 (described later in detail) to the retainer body 11. In this case, the tether 12 is fixed with the support shaft 11*f* so as not to be rotatable around the support shaft 11*f*. However, the configuration is not limited thereto, and the tether 12 may be fixed with the support shaft 11*f* so as to be rotatable around the support shaft 11*f*.

The tether 12 is a component serving to hold the electrical wire bundles 21*x* of the harness at the connector retainer 10.

Thus, the tether 12 is formed so as to include a support arm 12*a*, a fixing end portion 12*b*, and a harness insertion ring 12*c*.

The fixing end portion 12*b* of the tether 12 is provided at one end of the support arm 12*a*. The fixing end portion 12*b* is fixed to the support shaft 11*f* of the retainer body 11. In this case, the support arm 12*a* is disposed so as to extend in a direction substantially orthogonal to the axial direction of the support shaft 11*f*.

The support arm 12*a* is a rod part supporting the harness insertion ring 12*c* relative to the retainer body 11. The harness insertion ring 12*c* is permanently affixed to the other end of the support arm 12*a*.

The harness insertion ring 12*c* is an annular part through which the electrical wire bundles 21*x* of the harness extending from the harness connector 21 (first connector) pass. Thus, the harness insertion ring 12*c* is formed so as to have an insertion hole 12*d*. To insert the electrical wire bundles 21*x* into the insertion hole 12*d*, the insertion hole 12*d* is formed so as to have an inner diameter with which the harness connector 21 can be inserted. The embodiment illustrates the harness insertion ring 12*c* having a substantially annular shape, but the shape is not limited thereto.

The tether 12 is integrally attached to the retainer body 11 and thus forms a part of the connector retainer 10. The configuration of the connector retainer 10 of the embodiment has been described so far.

The operation of the connector retainer 10 of the embodiment configured in this manner will be described below with reference to, for example, FIG. 5 to FIG. 8.

Figure 5:
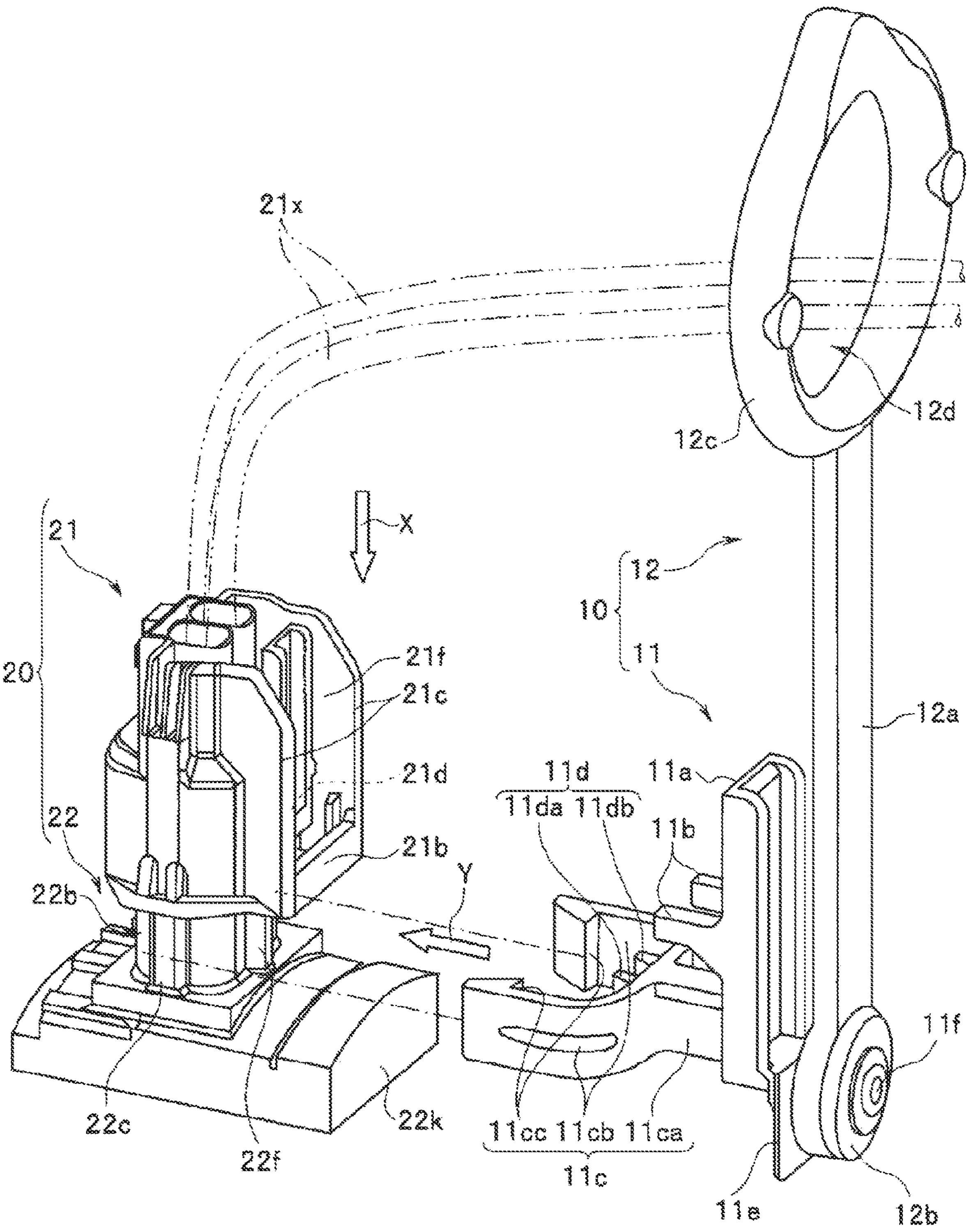
FIG. 5 is a schematic perspective view of the connector retainer of the embodiment of the disclosure that is yet to be attached to the connector device, the view illustrating an operation of the connector retainer.
Figure 6:
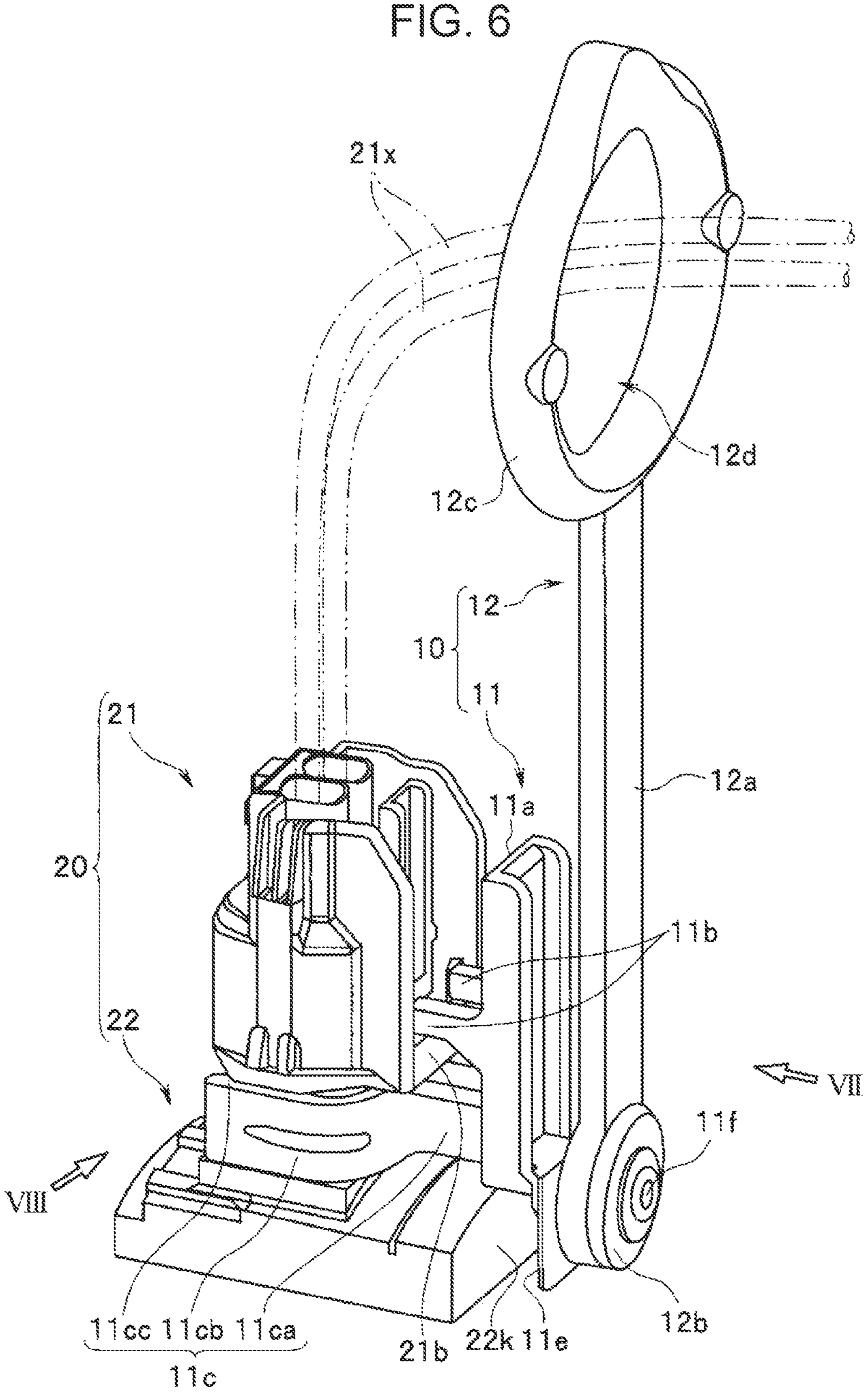
FIG. 6 is a schematic perspective view of the connector retainer attached to the connector device after the state in FIG. 5.
Figure 7:
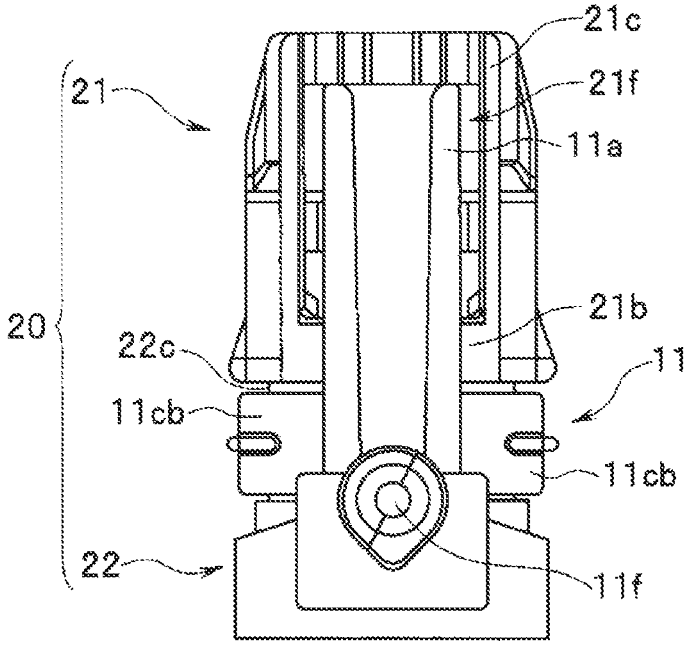
FIG. 7 is a plan view when viewed in the direction of arrow VII in FIG. 6.
Figure 8:
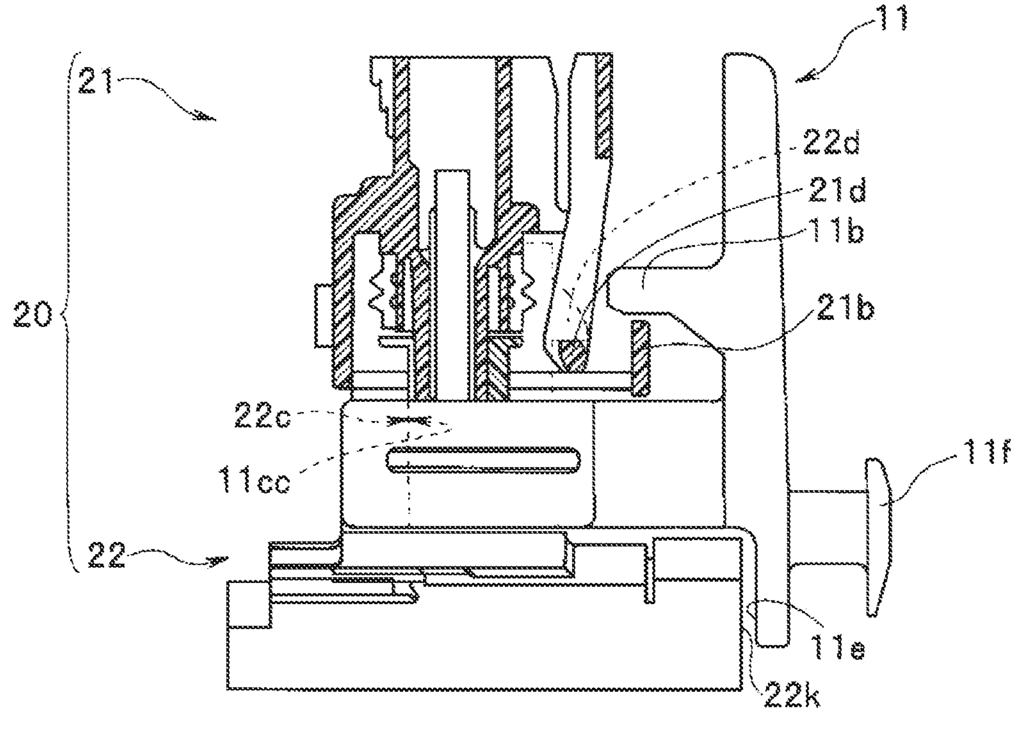
FIG. 8 is a plan view (partial sectional view) when viewed in the direction of arrow VIII in FIG. 6.

FIG. 5 to FIG. 8 are diagrams illustrating the operation of the connector retainer of the embodiment of the disclosure. FIG. 5 is a schematic perspective view of the connector retainer of the embodiment that is yet to be attached to the connector device in the engagement state. FIG. 6 is a schematic perspective view of the connector retainer attached to the connector device in the engagement state after the state in FIG. 5. FIG. 7 is a plan view when viewed in the direction of arrow VII in FIG. 6. FIG. 8 is a plan view (partial sectional view) when viewed in the direction of arrow VIII in FIG. 6. FIG. 7 and FIG. 8 do not illustrate the tether of the connector retainer of the embodiment.

First, the connector retainer 10 of the embodiment and the connector device 20 are in the state illustrated in FIG. 1. That is, the connector retainer 10 of the embodiment is not attached to the connector device 20. In addition, in this case, the harness connector 21 and the device-side connector 22 of the connector device 20 are not engaged with each other.

In this state, the harness connector 21 and the electrical wire bundles 21*x* are first inserted into the insertion hole 12*d* of the harness insertion ring 12*c* of the tether 12 of the connector retainer 10 of the embodiment.

Thus, the connector retainer 10 is attached to the target harness connector 21 (harness) of the intended connector device 20. Accordingly, it is possible to reduce operation mistakes such as forgetting to attach the connector retainer 10 even while the operation of insertion and removal of the connectors 21 and 22 of the connector device 20 is repeatedly performed during, for example, maintenance of an apparatus including the connector device 20.

After this state, the connector device 20 is made to be in the engagement state illustrated in FIG. 5 from the disengagement state illustrated in FIG. 1. That is, the projecting engagement member 21*a* of the harness connector 21 is engaged into the recessed engagement member 22*a* of the device-side connector 22 (see the direction of arrow X in FIG. 1 and FIG. 5).

The connector retainer 10 of the embodiment is attached to the connector device 20 in the engagement state formed in this manner. For that purpose, first, the flat surface of the cover 11*a* of the connector retainer 10 is disposed so as to face a predetermined surface (surface where the engagement maintaining mechanism is disposed) of the connector device 20 in the engagement state. Thus, the connector retainer 10 and the connector device 20 are in the state illustrated in FIG. 5.

In this state, the connector retainer 10 is moved toward the connector device 20 in the direction of arrow Y in FIG. 5. Then, the attachment arm unit 11*c* of the retainer body 11 of the connector retainer 10 is disposed so as to surround parts (side parts in the attachment direction Y) of the exposed member 22*b* of the device-side connector 22 of the connector device 20.

In this case, first, the pair of tip end arms 11*cb* of the attachment arm unit 11*c* move along the exposed member 22*b*. Then, the engagement claws 11*cc* come into contact with the respective lockable projections 22*c*. In this case, when the pair of tip end arms 11*cb* further move in the same direction (direction of arrow Y), the inclined surfaces of the engagement claws 11*cc* try to move over the respective lockable projections 22*c*. Thus, the tip end arms 11*cb* bend in respective directions in which the gap therebetween widens against the elasticity thereof. Then, the engagement claws 11*cc* move over the respective lockable projections 22*c*. Thereafter, the engagement claws 11*cc* are engaged with the respective lockable projections 22*c* (see reference signs 22*c* and 11*cc* in FIG. 8). In this case, the pair of tip end arms 11*cb* are disposed so as to surround the exposed member 22*b*. Thus, the attachment arm unit 11*c* is disposed at a predetermined position on the exposed member 22*b*. In this case, the effect of engaging the engagement claws 11*cc* with the respective lockable projections 22*c* restricts the attachment arm unit 11*c* from moving in the direction opposite to the direction of arrow Y in FIG. 5.

In addition, in this case, the improper attachment inhibiting member 11*e* is disposed at the position that faces the base surface 22*k* of the device-side connector 22. Thus, the connector retainer 10 is restricted from moving in the direction of arrow Y in FIG. 5.

Furthermore, the pair of projections 11*da* and 11*db* of the rotation inhibiting member 11*d* of the retainer body 11 of the connector retainer 10 are disposed so as to hold the lockable projection 22*f* of the device-side connector 22 therebetween. Thus, the connector retainer 10 is restricted from rotating around the exposed member 22*b*.

Furthermore, a part of the tip end of each of the locking arms 11*b* of the retainer body 11 of the connector retainer 10 is disposed in the internal region of the space 21*f* of the harness connector 21. Thus, the connector retainer 10 maintains the engagement state of the connector device 20 and inhibits the connectors 21 and 22 from being removed from each other.

In this manner, the connector retainer 10 of the embodiment and the connector device 20 are in the state illustrated in FIG. 6 to FIG. 8. This state is the state in which the connector retainer 10 is attached to the connector device 20.

As described above, according to the embodiment, the connector retainer 10 is formed in accordance with the configuration of the existing connector device 20, thus enabling smooth attachment thereof without changing the existing connector device 20.

The connector retainer 10 is capable of being easily attached to the existing connector device 20 with the one-touch operation of disposing the attachment arm unit 11*c* so as to surround the exposed member 22*b* of the existing connector device 20 to engage the engagement claws 11*cc* and the respective lockable projections 22*c* with each other. That is, the attachment can be completed by the simple operation of moving the connector retainer 10 in a predetermined direction toward the connector device 20 in the engagement state.

When the connector retainer 10 is attached to the connector device 20 in the engagement state, the locking arms 11*b* of the connector retainer 10 are disposed at the respective positions where the locking arms 11*b* can lock the plate-like locking member 21*b* of the connector device 20, thus inhibiting the harness connector 21 from moving in the direction in which the harness connector 21 is removed. Thus, it is possible to ensure redundancy of the engagement maintaining mechanism of the connector device 20. Accordingly, even when the engagement maintaining mechanism (see reference signs 21*d* and 22*d* in FIG. 8) of the connector device 20 is damaged due to various factors such as deterioration thereof and being hit, the redundancy of the engagement maintaining mechanism can inhibit the engagement of the connector device 20 from being released as long as the connector retainer 10 is attached thereto. Thus, it is possible to inhibit electrical coupling between devices from being released.

When the connector retainer 10 is attached to the connector device 20 in the engagement state, it is possible to protect the engagement maintaining mechanism (21*d* and 22*d*) from, for example, hitting stones due to the provision of the cover 11*a*, which protects the engagement maintaining mechanism of the connector device 20. Thus, the application of the connector retainer 10 to the connector device 20 of an accessory to be disposed on, for example, the outside of a vehicle can contribute to an improvement in the reliability of the connector device 20.

The connector retainer 10 can be supplied as an independent component separate from the existing connector device 20. Thus, for example, the connector retainer 10 can be used so as to be originally attached to the corresponding connector device 20 or can be used from any desired time so as to be attached to a device in operation.

The connector retainer 10 can be easily attached to and detached from the corresponding connector device 20 and thus can provide great ease of maintenance.

The provision of the tether 12 enables the connector retainer 10 to be attached in advance to the vicinity of the corresponding connector device 20 and thus enables a reduction of operation mistakes such as forgetting to attach the connector retainer 10 during, for example, maintenance.

Figure 9:
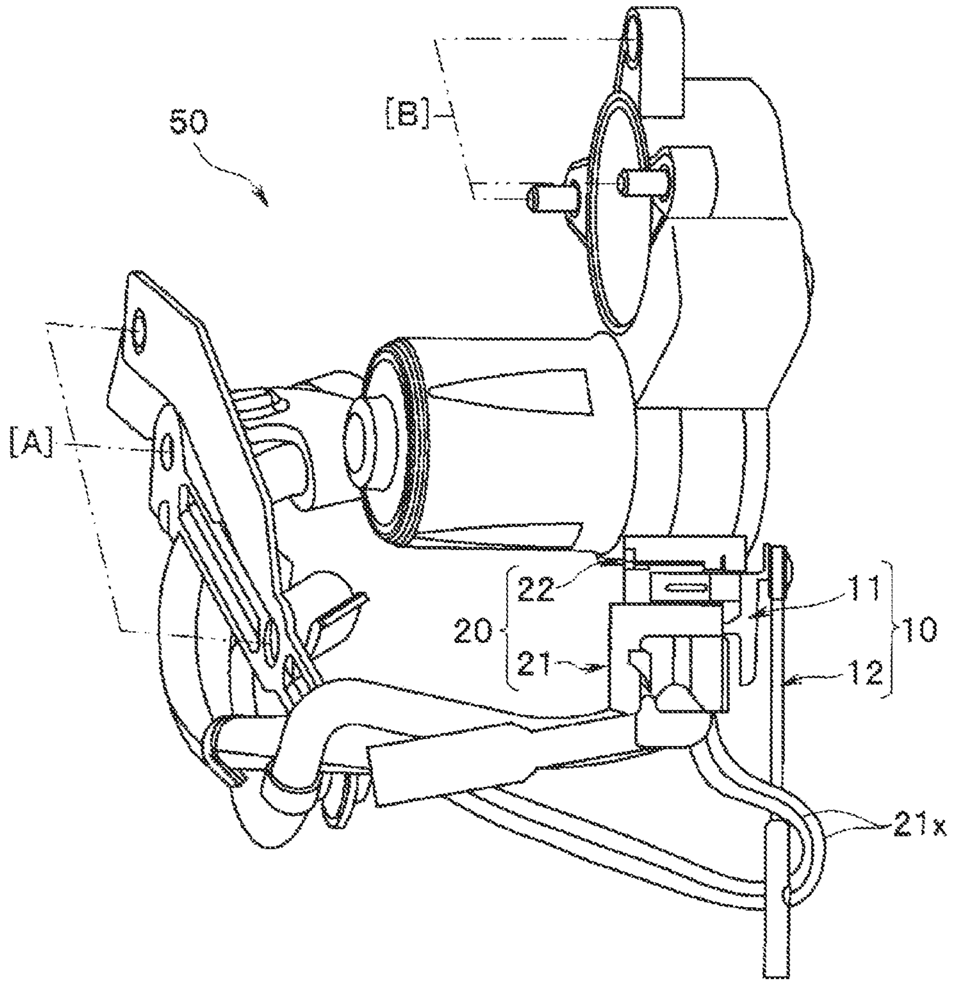
FIG. 9 is a diagram illustrating an embodiment in which the connector retainer of the embodiment of the disclosure is applied to an electric parking brake.

For example, the connector retainer 10 of the embodiment formed in this manner is applied to electrical accessories of a vehicle such as an automobile. FIG. 9 illustrates an embodiment in which the connector retainer 10 of the embodiment is applied to an electric parking brake serving as an electrical accessory to be mounted in a vehicle.

In FIG. 9, a reference sign 50 represents an electric parking brake serving as an electrical accessory to be mounted in a vehicle. The electric parking brake 50 is configured to be fixed, at the parts represented by reference signs A and B in FIG. 9, to fixing parts of a vehicle.

The device-side connector 22 is provided to the electric parking brake 50. The harness connector 21 is engaged with the device-side connector 22. The connector device 20 is formed by the harness connector 21 and the device-side connector 22. The electric parking brake 50 is configured to be capable of, for example, receiving electricity from a power source or performing signal communication with other devices (not illustrated) when the connector device 20 is in the engagement state.

In this case, as described above, the connector retainer 10 of the embodiment is attached to a predetermined position in the connector device 20. The electrical wire bundles 21*x* are inserted into the insertion hole 12*d* of the harness insertion ring 12*c* of the tether 12 of the connector retainer 10.

For example, the connector retainer 10 of the embodiment applied in this manner is capable of ensuring redundancy of the engagement maintaining mechanism of the connector device 20 of the electric parking brake 50. Simultaneously with this, the connector retainer 10 is capable of protecting the engagement maintaining mechanism of the connector device 20.

Thus, it is possible to inhibit the engagement of the connector device 20 of the electric parking brake 50 from being released against the intention of a user. Accordingly, it is possible to maintain safe vehicle operation.

The connector retainer 10 of the embodiment is not limited to the application example illustrated in the above embodiment (the electric parking brake 50 of a vehicle). The connector retainer 10 of the embodiment is widely applicable to connector devices configured to couple, in addition to other electrical accessories (for example, electric brakes) of a vehicle such as an automobile, for example, electronic devices or electronic components to be used on the outside of a vehicle, such as ABS sensors and wheel speed sensors.

The disclosure is not limited to the above embodiment, and various modifications and applications can be made without departing from the gist of the disclosure. In addition, the above embodiment includes techniques of the disclosure at various stages, and such various techniques of the disclosure can be extracted by appropriate combinations of components that are disclosed. For example, in a case where it is possible to solve the problem to be solved by the disclosure and achieve effects of the disclosure even when some components are removed from all the components illustrated in the embodiment, such a configuration in which some components are removed can be extracted as a technique of the disclosure. Furthermore, respective components of different embodiments may be combined as appropriate. The disclosure is not limited by specific embodiments thereof unless limited by the aspect of the disclosure.

The invention claimed is:

1. A connector retainer configured to be attached to a connector device, the connector device being provided with a first connector, a second connector configured to be engaged with the first connector, and comprising: an exposed member that is a part of an outer surface of the second connector exposed to an outside in an engagement state in which the first connector and the second connector are engaged with each other; and a projection projecting outward from the exposed member, and an engagement maintaining mechanism configured to maintain the engagement state in which the first connector and the second connector are engaged with each other, the connector retainer comprising:

a cover having a surface that is flat and extends in a direction parallel to an engagement direction in which the first connector is engaged with the second connector, the cover being configured to cover an outer surface of the engagement maintaining mechanism;

a locking arm projecting from the surface of the cover in a direction crossing the engagement direction, the locking arm being configured to lock a lockable plate of the first connector;

an engagement arm projecting from the surface of the cover in a direction crossing the engagement direction, the engagement arm being configured to be disposed so as to surround a part of the exposed member of the second connector; and an engagement claw disposed at a tip end of the engagement arm, the engagement claw being configured to be engaged with the projection.

2. The connector retainer according to claim 1, further comprising:

a tether into which a harness extending from the first connector is inserted; and an improper attachment inhibiting member configured to inhibit improper attachment of the connector retainer.

* * * * *